US009141259B2

(12) United States Patent
Bell et al.

(10) Patent No.: US 9,141,259 B2
(45) Date of Patent: Sep. 22, 2015

(54) PRESSURE NAVIGATION ON A TOUCH SENSITIVE USER INTERFACE (71) Applicant: International Business Machines Corporation, Armonk, NY (US)

(72) Inventors: Denise A Bell, Austin, TX (US); Jana H Jenkins, Raleigh, NC (US); Jeffrey A Kusnitz, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 325 days.

(21) Appl. No.: 13/746,188

(22) Filed: Jan. 21, 2013

(65) Prior Publication Data
US 2014/0208271 A1    Jul. 24, 2014

(51) Int. Cl.
G06F 3/0481    (2013.01)
G06F 3/0487    (2013.01)
G06F 3/0488    (2013.01)

(52) U.S. Cl.
CPC .......... G06F 3/04815 (2013.01); G06F 3/0487 (2013.01); G06F 3/0488 (2013.01); *G06F 2203/04105* (2013.01)

(58) Field of Classification Search
CPC . G06F 3/0487; G06F 3/0488; G06F 3/04816; G06F 2203/04105
See application file for complete search history.

(56) References Cited

U.S. PATENT DOCUMENTS

| 8,656,312 | B2* | 2/2014 | Kagaya et al. | 715/854 |
| 2002/0140717 | A1* | 10/2002 | Ho | 345/701 |
| 2004/0150630 | A1* | 8/2004 | Hinckley et al. | 345/173 |
| 2008/0062894 | A1 | 3/2008 | Ma et al. | |
| 2008/0094367 | A1 | 4/2008 | Van De Ven et al. | |
| 2010/0039393 | A1* | 2/2010 | Pratt et al. | 345/173 |
| 2010/0306702 | A1* | 12/2010 | Warner | 715/811 |
| 2010/0308844 | A1 | 12/2010 | Day et al. | |
| 2012/0038580 | A1* | 2/2012 | Sasaki | 345/173 |
| 2012/0126962 | A1* | 5/2012 | Ujii et al. | 340/407.2 |
| 2012/0147052 | A1* | 6/2012 | Homma et al. | 345/660 |
| 2012/0180001 | A1* | 7/2012 | Griffin et al. | 715/863 |
| 2012/0274662 | A1* | 11/2012 | Kim et al. | 345/650 |

OTHER PUBLICATIONS

"Novel Cascading Menus for a Touch Screen Device" IP.com, IPCOM000207897D, (Jun. 2011), 4 pages.

(Continued)

*Primary Examiner* — Anil Bhargava
(74) *Attorney, Agent, or Firm* — Jeffrey T. Holman (57) ABSTRACT A menu and application navigation system utilizing pressure includes a display device including a touch sensitive user interface, and a navigation engine coupled to the display device. The navigation engine is configured to generate a measurement of pressure applied by a user as a function of time at the touch sensitive user interface. The navigation engine is further configured to navigate through a three dimensional data set in response to the measurement of pressure. An increase in the pressure navigates in a first direction through the three dimensional data set, and a decrease in the pressure navigates in a second direction through the three dimensional data set.

17 Claims, 6 Drawing Sheets (56) References Cited

OTHER PUBLICATIONS

Wilson et al. "Pressure-Based Menu Selection for Mobile Devices" Proceedings of the 12th International Conference on Human Computer Interaction with Mobile Devices and Services, (Sep. 2010), pp. 181-190.

Blasko et al. "An Extended Menu Navigation Interface Using Multiple Pressure-Sensitive Strips" Proceedings of the Seventh IEEE International Symposium on Wearable Computers, (Oct. 2005), pp. 238-239.

* cited by examiner

PRESSURE NAVIGATION ON A TOUCH SENSITIVE USER INTERFACE

BACKGROUND

Navigating through content or applications on a touch screen device may be difficult, especially for mobile phones or other mobile platforms with smaller display dimensions. Many users seek to move quickly and efficiently to the desired content while retaining context. Retaining context while navigating through a menu or application may also be difficult. Navigating through levels of data may involve multiple inputs or multiple touch gestures by a user, increasing the likelihood of losing context as well as increasing the time to navigate multiple levels of a menu or application.

SUMMARY

Embodiments of a system are described. In one embodiment, a menu and application navigation system utilizing pressure includes a display device including a touch sensitive user interface, and a navigation engine coupled to the display device. The navigation engine is configured to generate a measurement of pressure applied by a user as a function of time at the touch sensitive user interface. The navigation engine is further configured to navigate through a three dimensional data set in response to the measurement of pressure. An increase in the pressure navigates in a first direction through the three dimensional data set, and a decrease in the pressure navigates in a second direction through the three dimensional data set. Other embodiments of the system are also described, as well as embodiments of a computer program product and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate navigating through a three dimensional data set in response to a measurement of pressure. As used herein, navigation refers to an act of changing content displayed on a device, including moving between different portions of a set of content (e.g. pages), as well as changing from one set of content to a different set of content. Navigating through a menu, content, or applications on a touch screen device may be difficult, especially for mobile phones or other mobile platforms with smaller display constraints. Retaining context while navigating through the menu, content, or application may be difficult after multiple steps. Devices with small display dimensions typically use much of the display space to display the desired content leaving little room to display the context or path to the content. Navigating through levels of data may require many inputs or multiple touch gestures by a user, increasing the likelihood of losing context. Returning back through the levels of data may require different inputs or different touch gestures making it difficult to quickly navigate back and forth. Many users seek to move quickly to the desired screen and back while retaining context. Reducing the amount of touches needed to navigate through levels of data may increase productivity, user satisfaction, the speed of navigation and improve the retention of context.

Some embodiments described herein include generating a measurement of pressure applied by a user as a function of time at a touch sensitive user interface. Some embodiments include navigating through a three dimensional data set in response to the measurement of pressure. In some embodiments, an increase in pressure navigates in a first direction through the three dimensional data set. A decrease in pressure navigates in a second direction through the three dimensional data set. Some embodiments further include navigating through levels of the three dimensional data set. In some embodiments, an increase in the pressure navigates in a first direction through the levels of the three dimensional data set, and a decrease in pressure navigates in a second direction through the levels of the three dimensional data set. Some embodiments allow the user to navigate through multiple levels with an increase or decrease in pressure of a single touch. The user can navigate quickly through a three dimensional data set in more than one direction.

Figure 1:
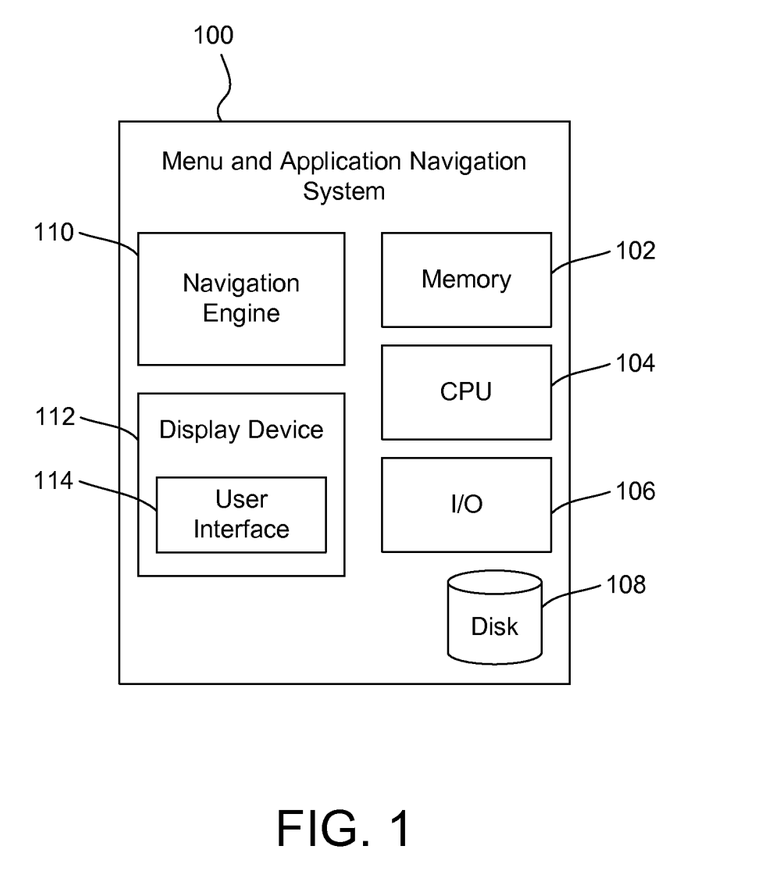
FIG. 1 depicts a schematic diagram of one embodiment of a menu and application navigation system.

FIG. 1 depicts a schematic diagram of one embodiment of a menu and application navigation system 100. The depicted menu and application navigation system 100 includes various components, described below, that are capable of performing the functions and operations described herein. The illustrated menu and application navigation system 100 includes a computer memory device 102, a processing device 104, input/output devices 106, and a disk storage device 108. The illustrated menu and application navigation system 100 also includes a navigation engine 110 and a display device 112. Some or all of the components of the menu and application navigation system 100 may be stored on a single computing device or on a network of computing devices, including a wireless communication network. The menu and application navigation system 100 may be a single device such as a mobile phone, a smart phone, a portable media device, a tablet computer, a laptop computer, a desktop computer, or other device or a combination of devices. Although the menu and application navigation system 100 is shown and described with certain components and functionality, other embodiments of the menu and application navigation system 100 may include fewer or more components to implement less or more functionality.

The computer memory device 102 may store data and/or software instructions or computer program instructions for carrying out the operations described herein. The computer memory device 102 may be external or internal to the system and may include but is not limited to a hard drive, a CD/DVD recordable drive, a magnetic tape drive, a disk cartridge drive, a secure digital card, another type of magnetic or optical drive, a solid-state drive, or another type of memory device. The processing device 104 is connected to and in communication with the memory device 102 and may store and access data on the memory device 102 for performing the operations described herein. The processor or processing device 104 may also be connected to the disk storage device 108. The disk storage device 108 may be implemented to temporarily store data or software instructions from the memory device 102 or the processor 104. The disk storage device 108 may include but is not limited to a hard disk drive, a floppy disk drive, a removable floppy disk, or other type of optical or magnetic drive, or another persistent storage device. The functionality of the navigation engine 110 may be implemented by computer program instructions stored on the computer memory device 102 and executed by the processing device 104 such as a CPU.

A user interface 114 is displayed on the display device 112. The display device 112 may be any display device 112 for a computing device. The user interface 114 may be part of an operating system for the computing device and may allow a user to interact with the operating system. The user interface 114 is a touch sensitive user interface. The user interface 114 may be pressure sensitive or may use another technology to generate a measurement of pressure or its equivalent. The user interface 114 may be a resistive touch screen, a capacitive touch screen, or another type of touch screen. The user interface 114 may use another technology to generate a measurement of pressure such as surface acoustic wave technology, infrared, optical imaging technology, dispersive signal technology, or acoustic pulse recognition, or another technology that generates a measurement of pressure or generates another measurement that may be converted into a measurement of pressure. For example, the touch screen user interface 114 may correlate a measurement of a depression or the area touched with a measurement of pressure. The increasing area of an impression may be equivalent to increasing pressure. Similarly, decreasing area of an impression may be equivalent to decreasing pressure. Some embodiments include a visual representation of pressure or a change in pressure. The visual representation may be a bar graph, a numerical value, a pointer and dial, a changing colored area, or any other visual representation capable of showing the level of pressure or the change in pressure. The operations described herein may be associated with one or more applications configured to operate within the operating system.

In some embodiments, the navigation engine 110 is configured to generate a measurement of pressure applied by a user as a function of time at the touch sensitive user interface 114. In some embodiments, the navigation engine 110 is further configured to navigate through a three dimensional data set in response to the measurement of pressure. The three dimensional data set may be a single file, multiple files, a document, a photograph, an application, a file manager application, or any other three dimensional data set capable of navigation. Navigating through a three dimensional data set may include opening a document within a file folder after navigating through the file folders of a file manager application. An increase in the pressure navigates in a first direction through the three dimensional data set, and a decrease in pressure navigates in a second direction through the three dimensional data set. For example, an increase in pressure may navigate through pages of a document in ascending order, and a decrease in pressure may navigate through the pages of the document in descending order or vice versa. In another example, an increase in pressure may navigate in a first direction through sheets of a spreadsheet, and a decrease in pressure may navigate back in the opposite direction. In some embodiments, the navigation engine 110 is further configured to navigate through levels of the three dimensional data set in response to the measurement of pressure. Levels of a three dimensional data set may be layers of a photograph, layers in a drawing, folders of a file path, sections of a document, or any other level of a data set. A photograph or drawing may have layers, and an increase in pressure navigates in a first direction through the layers, and a decrease in pressure navigates in a second direction through the layers. In another example, a drawing of a human may include multiple layers or levels including a clothing layer, a skin layer, a tissue/muscles layer, a circulatory layer, and a skeletal layer. An increase in pressure navigates in a first direction through the layers or levels (e.g. from skin layer to tissue/muscles layer to circulatory layer to skeletal layer). A decrease in pressure navigates in a second direction through the layers or levels (e.g. from the skeletal layer to the circulatory layer etc.).

In some embodiments, the navigation engine 110 is further configured to skip designated levels of a three dimensional data set. For example, where the levels of a three dimensional data set are sections and subsections of a document, the navigation engine 110 may be configured to navigate through the document sections while skipping over the subsection headings, increasing the speed of navigation. In some embodiments, the levels to be skipped may be designated manually by the user. In other embodiments, the levels to be skipped may be established autonomously (e.g. from the hierarchy of formatting in the document). In some embodiments, skipping levels may be in response to another user input. In some embodiments, skipping levels may be in response to a user input increasing pressure for a period of time.

Some embodiments allow a user to retain context while navigating through a three dimensional data set. In some embodiments, the navigation engine 110 is further configured to simultaneously display a previously viewed level of the three dimensional data set while displaying a next level of the three dimensional data set upon selection of the next level by the user. For example, schematic plans to a house may include levels corresponding to various plans for the house such as separate plans for electrical, plumbing, heating/air conditioning, appliances, and furniture layout. Some embodiments allow cumulative viewing by allowing the user to navigate through each plan (i.e. electrical, plumbing, heating/air conditioning etc.) but view more than one level at the same time. As the user navigates from the electrical plans to the plumbing plans by increasing pressure the electrical plans may continue to display along with the plumbing plans.

In some embodiments, the navigation engine 110 is further configured to fan out a level of the data set in response to an input by the user. The fanning out of the level displays the data set of the level in a fan configuration. The input by the user may be a separate gesture, a swipe, a swivel, or another user touch gesture. A fan configuration is a visual representation of data radially centered on a common point or icon, or linearly spaced, or otherwise spaced to allow viewing of more content within a level of the three dimensional data set. The fan configuration allows the user to view a subset of data of a level in a user friendly manner. Further, the fan configuration may allow the user to select or designate the path for continued navigation. For example, a user may be navigating through a file manager application and the content of a file folder may include five distinct files and two file folders. Upon fanning out the five files and two file folders, one of the files or file folders may be designated by default. As the user continues to increase or decrease the pressure of a touch, navigation will continue by selecting the file or file folder designated. Additionally, the user may rotate the default designation through the content (i.e. the five files and two file folders) until the desired file or file folder is designated before continuing navigation.

In some embodiments, the navigation engine 110 is further configured to anchor a first level of the three dimensional data set and navigate to the first level of the three dimensional data set in response to a termination of a measurement of pressure. In some embodiments, the user may establish the anchor level. For example, a user may anchor the first section of a document. The user may navigate through the document by increasing and decreasing the pressure of an input touch gesture. As the user releases the touch gesture, the termination of a measurement of pressure navigates the document back to the anchored first section of the document. In other embodiments, the anchor level may be automatically established. For example, the first section in a document may automatically be established as the anchor level, or the level viewed when the system 100 or the navigation engine 110 is activated. In some embodiments, the navigation engine 110 is further configured to navigate by scrolling through a document. An increase in pressure scrolls in a first direction, and a decrease in pressure scrolls in a second direction.

In some embodiments, the navigation engine 110 is further configured to associate the levels of the three dimensional data set with corresponding ranges of pressure measurement. In some embodiments, the ranges of pressure measurement are equal ranges in extent. In other embodiments, the ranges of pressure measurement are not equal ranges. For example, a three dimensional data set may have three navigable levels A, B, and C. Further, the navigation engine 110 may be capable of generating thirty distinct measurements of pressure. For the sake of simplicity, these measurements may be one to thirty psi. In some embodiments, each level (A, B, C) is associated with a range of equal extent (i.e. A is associated with 1-10 psi, B is associated with 11-20 psi, C is associated with 21-30 psi). In some embodiments, each range of pressure measurement is exclusive of each other range of pressure measurement. In some embodiments, each range of pressure measurement is associated with a single level of the three dimensional data set. In some embodiments, the navigation engine 110 is further configured to navigate to a level of the three dimensional data set in response to the pressure measurement being within the range of pressure measurement corresponding to the level of the three dimensional data set. For example, any pressure measurement within the range of 21-30 psi will navigate to level C. Alternatively, navigation is based on a change in pressure and a change in pressure within a range navigates through a three dimensional data set. For example, a change in pressure equivalent to an increase of 3-6 psi may navigate in a first direction. In some embodiments, the greater the change in pressure the faster the navigation occurs. For example, a change in pressure equivalent to an increase of 7-9 psi may navigate through a three dimensional data set more quickly than the change of 3-6 psi. Further, a change below 3 psi may be below the threshold for navigation.

In addition to the advantages which may be achieved by implementation of the individual components of the menu and application navigation system 100, some embodiments of the menu and application navigation system 100 provide additional advantages over conventional technology. For example, some embodiments of the menu and application navigation system 100 allow a user to quickly navigate through a three dimensional data set with a single touch and an increase or decrease in the pressure of the touch. The user is not required to use multiple inputs to navigate through the data set. Embodiments of the system 100 allow a user to quickly navigate in more than one direction while using a single touch and navigating by increasing or decreasing the pressure of the touch. Some embodiments allow a user to retain context during navigation by simultaneously displaying current and previously viewed levels of a three dimensional data set as the user navigates.

Figure 2A:
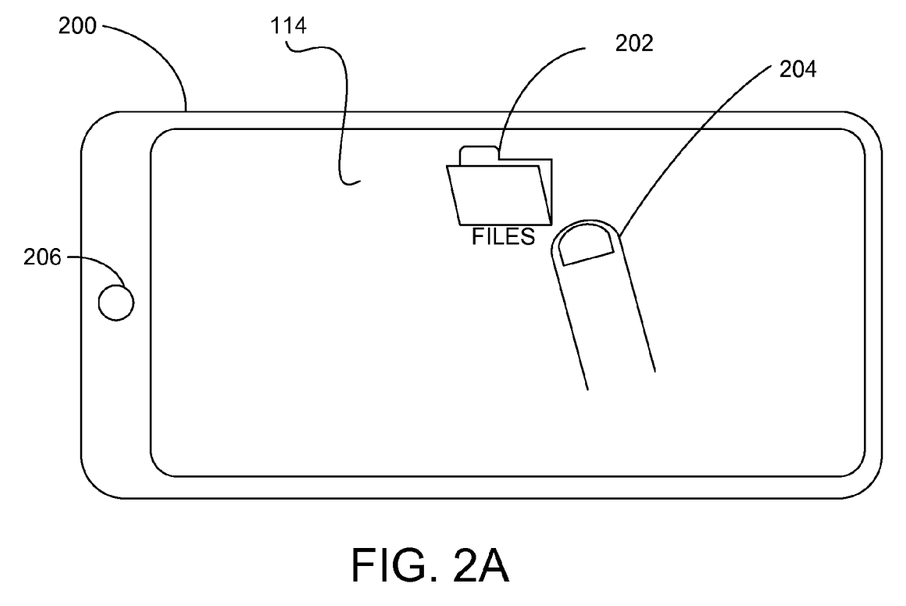
FIG. 2A depicts one embodiment of a touch sensitive user interface of a mobile computing device implementing the menu and application navigation system of FIG. 1.

FIG. 2A depicts one embodiment of a touch sensitive user interface 114 of a mobile computing device 200 implementing the menu and application navigation system 100 of FIG. 1. FIG. 2A depicts a file folder 202 of a file manager application and a user input by a user's finger 204. FIG. 2A shows the user 204 selecting the file folder 202 titled FILES, to navigate through a file manager application. FIG. 2A also shows an input button 206 external to the user interface 114.

Figure 2B:
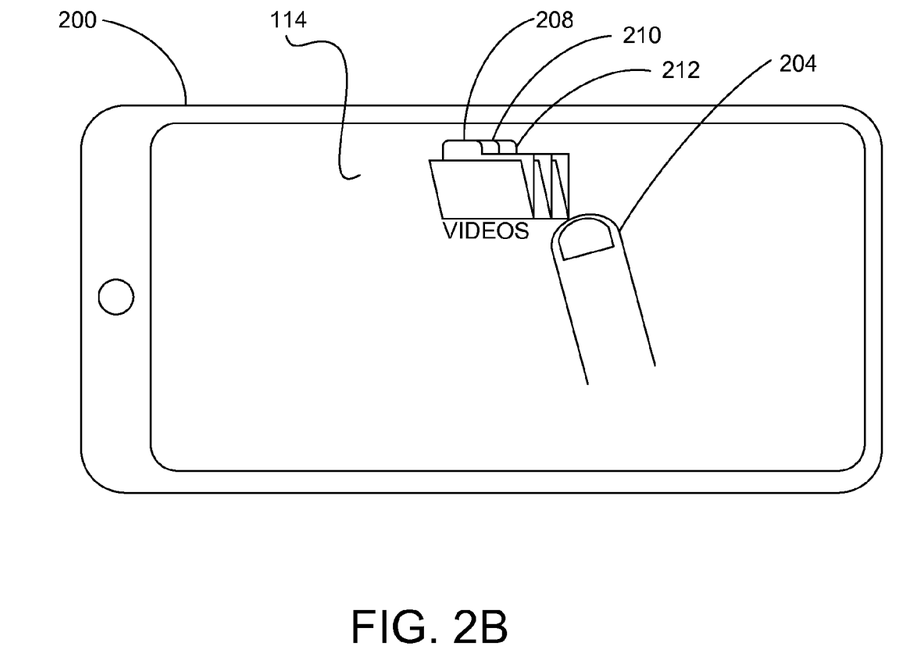
FIG. 2B depicts one embodiment of the touch sensitive user interface of the mobile computing device of FIG. 2A after a user input and navigation.

FIG. 2B depicts one embodiment of the touch sensitive user interface 114 of the mobile computing device 200 of FIG. 2A after a user input and navigation. After the user input, the file manager application has navigated through the three-dimensional data set. FIG. 2B shows the contents of file folder 202. FIG. 2B shows file folder 208 titled VIDEOS and two other file folders 210 and 212. In some embodiments, as the user increases the pressure of the input, navigation will continue navigating and will show the contents of the VIDEOS file folder 208. As the user decreases the pressure of the input, the file manager application will navigate back to the FILES file folder 202.

Figure 2C:
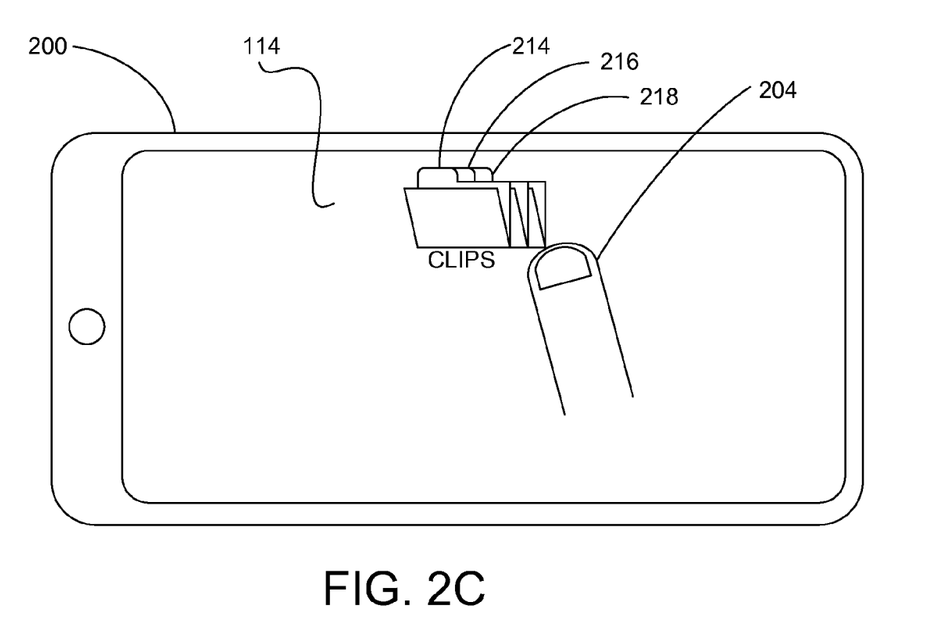
FIG. 2C depicts one embodiment of the touch sensitive user interface of the mobile computing device of FIGS. 2A and 2B after further navigation.

FIG. 2C depicts one embodiment of the touch sensitive user interface 114 of the mobile computing device 200 of FIGS. 2A and 2B after further navigation. FIG. 2C shows the contents of the VIDEOS file folder 208. FIG. 2C shows file folder 214 titled CLIPS and two other file folders 216 and 218. In some embodiments, as the user increases the pressure of the input, navigation will continue navigating and will show the contents of the CLIPS file folder 214. As the user decreases the pressure of the input, the file manager application will navigate back to the VIDEOS file folder 208 and the FILES file folder 202. In some embodiments, the user can continue navigating back and forth through multiple file folders 202, 208, and 214 without lifting the user's finger off the touch sensitive user interface 114 by increasing or decreasing the pressure of the input. The path and direction of navigation may be predetermined, designated by the user, or designated by the system 100 or the three dimensional data set. In some embodiments, the user may designate default preferences for pressure navigation or may indicate a unique path for each three dimensional data set. In another embodiment, the path may be determined by user statistics or metadata of the three dimensional data set. The pressure of the input may be measured in many different ways and need not be directly measured as pressure.

Figure 2D:
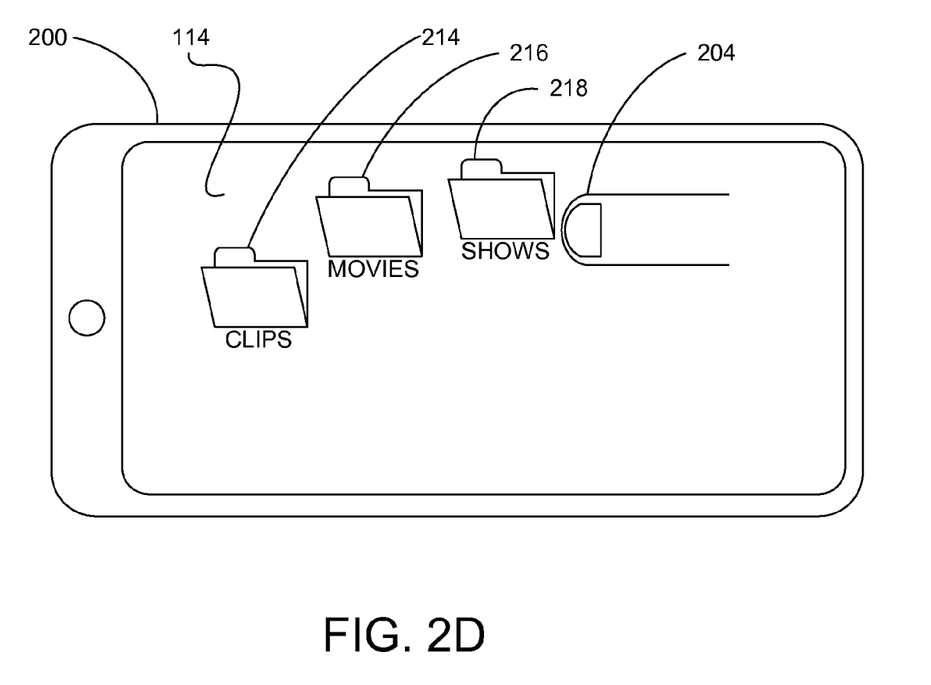
FIG. 2D depicts one embodiment of the touch sensitive user interface of the mobile computing device of FIGS. 2A, 2B, and 2C with a level of the three dimensional data set fanned out.

FIG. 2D depicts one embodiment of the touch sensitive user interface 114 of the mobile computing device 200 of FIGS. 2A, 2B, and 2C with a level 214-218 of the three dimensional data set fanned out. In some embodiments, a level 214-218 of the three dimensional data set fans out in response to an input by the user 204. In some embodiments, the fanning out of the level 214-218 displays the data set of the level 214-218 in a fan configuration. FIG. 2D shows the file folders 214, 216, and 218 fanned out in a fan configuration in response to a user input. Instead of showing only the CLIPS filed folder 214 with file folders hidden behind as depicted in FIG. 2D, the file folders 214, 216, and 218 are displayed in a fan configuration. File folder 216 titled MOVIES and file folder 218 titled SHOWS are visible and available for further navigation. In some embodiments, the user input may be a separate touch gesture or may be a continuation of the pressure navigating input.

Figure 2E:
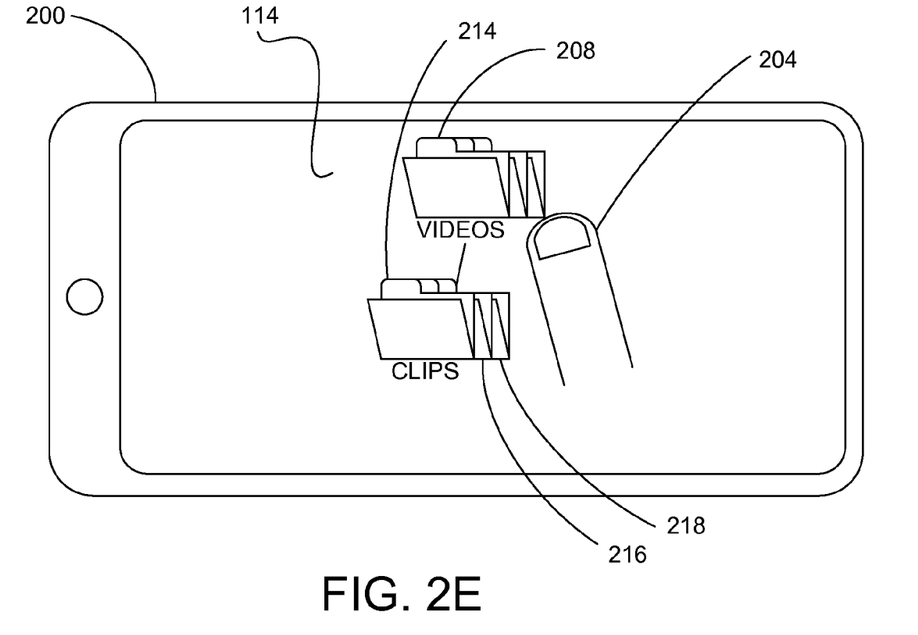
FIG. 2E depicts one embodiment of the touch sensitive user interface of the mobile computing device of FIGS. 2A and 2B showing context after further navigation.

FIG. 2E depicts one embodiment of the touch sensitive user interface 114 of the mobile computing device 200 of FIGS. 2A and 2B showing context after further navigation. FIG. 2E shows the contents of the VIDEOS file folder 208. FIG. 2E shows file folder 214 titled CLIPS and two other file folders 216 and 218. Some embodiments simultaneously display a previously viewed level (file folders 208-212) of the three dimensional data set while displaying a next level (file folders 214-218) of the three dimensional data set upon selection of the next level by the user 204. Some embodiments allow a user 204 to retain context while navigating through a data set.

Some embodiments include anchoring to a first level, file folder 202 (shown in FIG. 2A), of a three dimensional data set. The user 204 may navigate to different levels, such as file folders 208-212 and 214-218, through increasing and decreasing pressure. In some embodiments, upon a termination of measurement of pressure as the user 204 releases the input, the operations may include navigating to the first level, file folder 202, of the three dimensional data set. In some embodiments, navigation to the anchored level 202 occurs regardless of the level displayed when the user 204 releases the input.

Some embodiments include associating levels (file folders 202, 208-212, and 214-218) of the three dimensional data set with corresponding ranges of pressure measurement. For example, in the situation where pressure measurements generated at a touch sensitive user interface 114 occur between 1 psi and 21 psi, each level may be linked to a range of pressure measurement. File folder 202 may be associated with or linked to 1-7 psi, file folders 208-212 may be linked to 8-14 psi, and file folders 214-218 may be linked to 15-21 psi. In some embodiments, the ranges of pressure measurement are equal ranges in extent. In other embodiments, the ranges of pressure measurement are not equal ranges. Some embodiments further include navigating to a level (file folders 214-218) of the three dimensional data set in response to the pressure measurement (for example, 17 psi) being within the range of pressure measurement (15-21 psi) corresponding to the level (file folders 214-218) of the three dimensional data set. In some embodiments, each range of pressure measurement is exclusive of each other range of pressure measurement. In some embodiments, each range of pressure measurement (for example, 1-7 psi) is associated with a single level (for example, file folder 202) of the three dimensional data set. In some embodiments, the measurement of pressure may be a correlation to a measurement of the area of a depression in the touch sensitive user interface 114. In some embodiments, the measurement of pressure may be a correlation to a measurement of the area touched in the touch sensitive user interface 114.

Figure 2F:
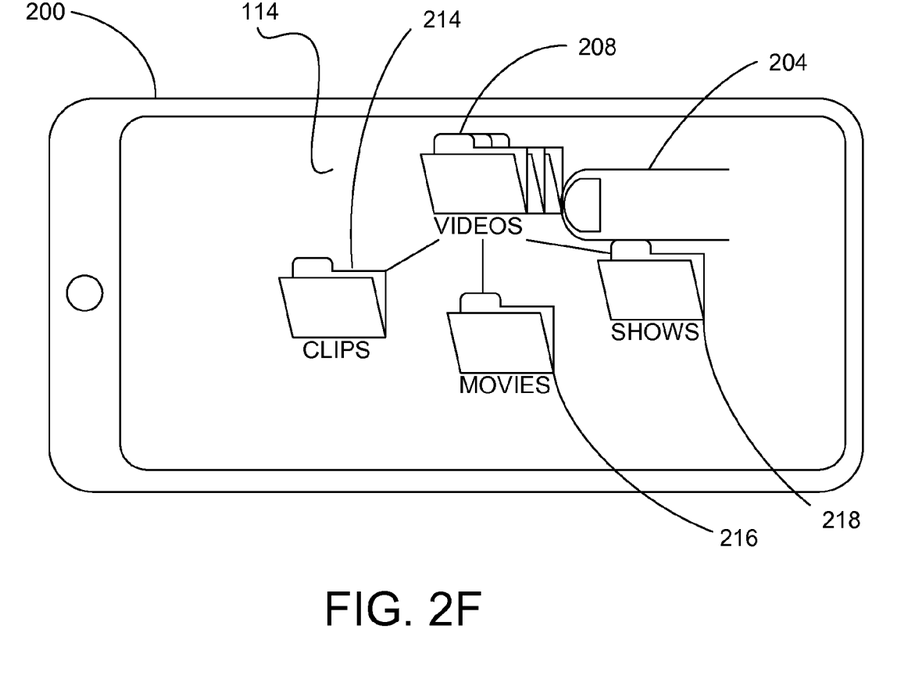
FIG. 2F depicts one embodiment of the touch sensitive user interface of the mobile computing device of FIG. 2E with a level of the three dimensional data set fanned out in a fan configuration.

FIG. 2F depicts one embodiment of the touch sensitive user interface 114 of the mobile computing device 200 of FIG. 2E with a level 214-218 of the three dimensional data set fanned out in a fan configuration. Some embodiments include fanning out a level 214-218 of the data set in response to an input by the user 204. In some embodiments, fanning out displays the data set of the level in a fan configuration. FIG. 2F shows a level 214-218 of the data set fanned out in a fan configuration after an input by user 204. File folders 214, 216, and 218 are shown allowing navigation further through the three dimensional data set. In some embodiments, the input is a separate gesture, a swipe, a swivel, or another type of user touch gesture. In some embodiments, the input may occur while the user 204 continues the original pressure navigation input. In some embodiments, fanning out the level 214-218 of the data set and returning to the original configuration occur in response to increasing and decreasing the pressure of an input as a function of time.

Figure 3:
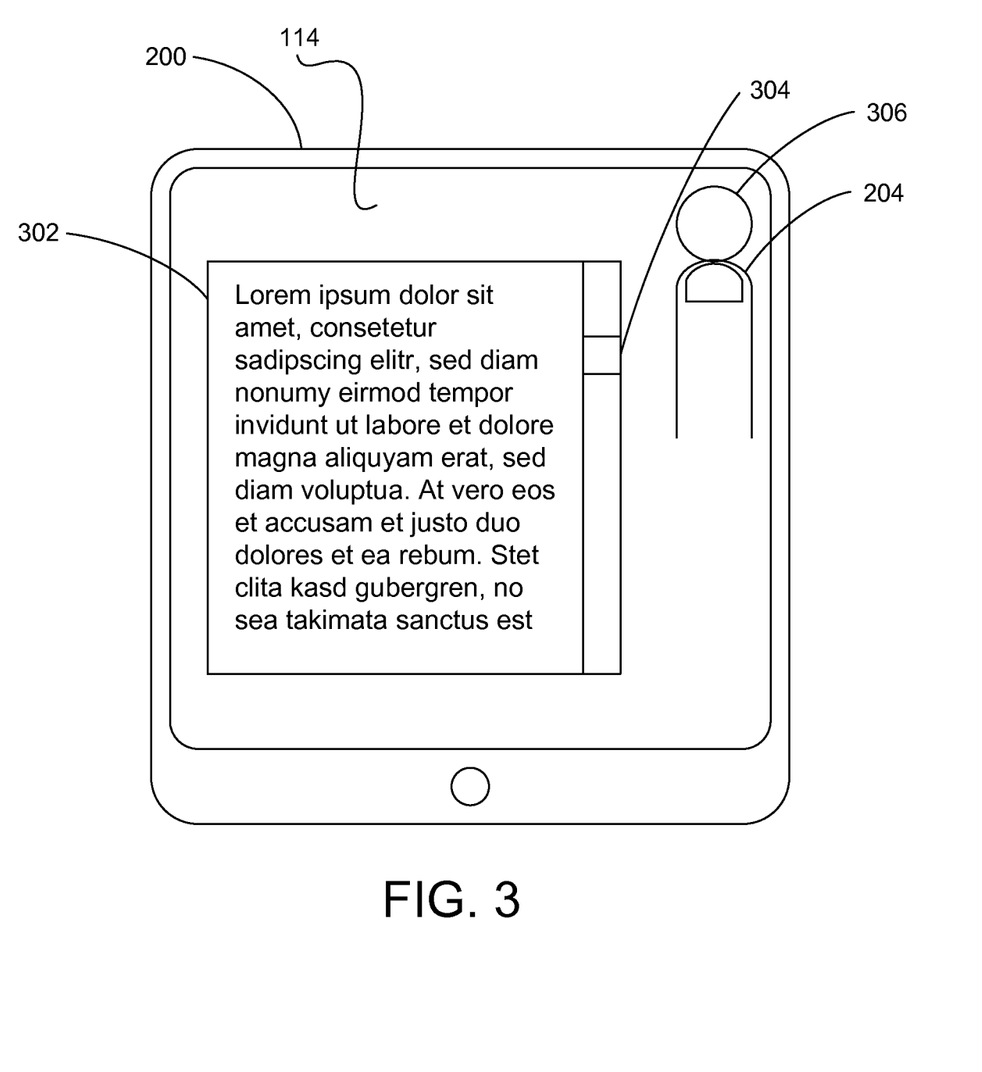
FIG. 3 depicts one embodiment of a touch sensitive user interface of a mobile computing device showing a navigable document.

FIG. 3 depicts one embodiment of a touch sensitive user interface 114 of a mobile computing device 200 showing a navigable document 302. FIG. 3 depicts the navigable document 302 with a scroll bar 304. Some embodiments include a node 306 at which the user 204 input of pressure may be generated and measured. In some embodiments, the node 306 is visually represented on the touch sensitive user interface 114. In some embodiments, the node 306 is not visible on the touch sensitive user interface 114. In some embodiments, the navigating through a three dimensional data set includes scrolling through a document 302. An increase in the pressure scrolls in a first direction, for example down through the document 302. A decrease in the pressure as a function of time scrolls in a second direction through the document 302. The document 302 may be any type of navigable document capable of scrolling, a scrollable web page, or something similar.

Figure 4:
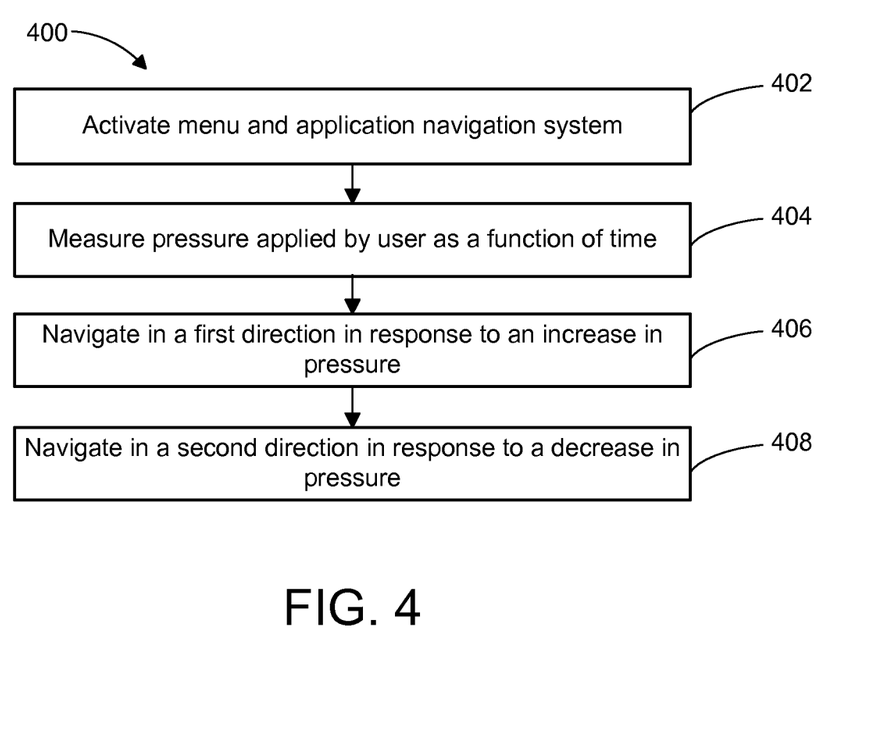
FIG. 4 depicts a flow chart diagram of one embodiment of a method for utilizing pressure for menu and application navigation.

FIG. 4 depicts a flow chart diagram of one embodiment of a method 400 for utilizing pressure for menu and application navigation. Although the method 400 is described in conjunction with the menu and application navigation system 100 of FIG. 1 and the mobile computing device 200 of FIGS. 2A through 2F, embodiments of the method may be implemented with other types of computer systems, devices, and combinations thereof.

At 402, the menu and application navigation system 100 is activated. At 404, a pressure measurement is generated as a function of time on a touch sensitive user interface 114. At 406, navigation in a first direction occurs in response to an increase in pressure as a function in time. At 408, navigation in a second direction occurs in response to a decrease in pressure as a function in time. The method 400 then ends.

Other embodiments of the method 400 may include some or all the operations and steps as described above in conjunction with FIGS. 1-3 in various combinations.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a menu and application navigation system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising a non-transitory computer useable storage medium including a computer readable program, wherein the computer readable program includes instructions that, when executed by a processing device within a computer, cause the computer to perform operations comprising:

generating a measurement of pressure applied by a user as a function of time at a touch sensitive user interface in response to a pressure input;

navigating through levels of a three dimensional data set in response to the measurement of pressure of the pressure input, wherein the levels comprise sections of a document, wherein the navigating further comprises scrolling through the levels of the document, wherein an increase in the pressure scrolls in a first direction through the three dimensional data set, and a decrease in the pressure scrolls in a second direction through the three dimensional data set; and wherein navigating through levels of the three dimensional data set further comprises skipping over designated levels, wherein the designated levels to be skipped are established autonomously from the hierarchy of formatting in the document.

2. The computer program product of claim 1, wherein the skipping over designated levels is in response to a user input increasing pressure for a period of time and wherein the designated levels to be skipped are established autonomously from the three dimensional data set.

3. The computer program product of claim 2, wherein the operations further comprise retaining a display of a level previously navigated through and simultaneously displaying the previously navigated level of the three dimensional data set while displaying a next level of the three dimensional data set upon selection of the next level by the user.

4. The computer program product of claim 2, wherein the operations further comprise fanning out a current level of the data set in response to an input by the user concurrent to the pressure input, wherein the fanning out displays the data set of the level in a fan configuration.

5. The computer program product of claim 2, wherein the operations further comprise:
 anchoring a first level of the three dimensional data set; and
 navigating back to the first level of the three dimensional data set from a current level in response to a termination of measurement of pressure.

6. The computer program product of claim 2, wherein the operations further comprise:
 associating the levels of the three dimensional data set with corresponding ranges of pressure measurement, wherein each range of pressure measurement is exclusive of each other range of pressure measurement, and wherein each range of pressure measurement is associated with a single level of the three dimensional data set; and
 navigating to a level of the three dimensional data set in response to the measurement of pressure measuring within the range of pressure measurement corresponding to the level of the three dimensional data set.

7. A method for utilizing pressure for menu and application navigation, the method comprising:
 generating a measurement of pressure applied by a user as a function of time at a touch sensitive user interface in response to a pressure input;
 navigating through levels of a three dimensional data set in response to the measurement of pressure of the pressure input, wherein the levels comprise sections of a document, wherein the navigating further comprises scrolling through the levels of the document, wherein an increase in the pressure scrolls in a first direction through the three dimensional data set, and a decrease in the pressure scrolls in a second direction through the three dimensional data set; and
 wherein navigating through levels of the three dimensional data set further comprises skipping over designated levels, wherein the designated levels to be skipped are established autonomously from the hierarchy of formatting in the document.

8. The method for utilizing pressure for menu and application navigation of claim 7, wherein the skipping over designated levels is in response to a user input increasing pressure for a period of time and wherein the designated levels to be skipped are established autonomously from the three dimensional data set.

9. The method for utilizing pressure for menu and application navigation of claim 8, the method further comprising retaining a display of a level previously navigated through and simultaneously displaying the previously navigated level of the three dimensional data set while displaying a next level of the three dimensional data set upon selection of the next level by the user.

10. The method for utilizing pressure for menu and application navigation of claim 8, the method further comprising fanning out a current level of the data set in response to an input by the user concurrent to the pressure input, wherein the fanning out displays the data set of the level in a fan configuration.

11. The method for utilizing pressure for menu and application navigation of claim 8, the method further comprising:
 anchoring a first level of the three dimensional data set; and
 navigating back to the first level of the three dimensional data set from a current level in response a termination of measurement of pressure.

12. The method for utilizing pressure for menu and application navigation of claim 8, the method further comprising:
 associating the levels of the three dimensional data set with corresponding ranges of pressure measurement, wherein each range of pressure measurement is exclusive of each other range of pressure measurement, and wherein each range of pressure measurement is associated with a single level of the three dimensional data set; and
 navigating to a level of the three dimensional data set in response to the measurement of pressure measuring within the range of pressure measurement corresponding to the level of the three dimensional data set.

13. A menu and application navigation system utilizing pressure, the system comprising:
 a display device comprising a touch sensitive user interface, and
 a navigation engine coupled to the display device, the navigation engine configured to:
 generate a measurement of pressure applied by a user as a function of time at the touch sensitive user interface in response to a pressure input; and
 navigate through levels of a three dimensional data set in response to the measurement of pressure of the pressure input, wherein the levels comprise sections of a document, wherein the navigation engine is further configured to navigate by scrolling through the levels of the document, wherein an increase in the pressure scrolls in a first direction through the three dimensional data set, and a decrease in the pressure scrolls in a second direction through the three dimensional data set; and
 wherein navigating through levels of the three dimensional data set further comprises skipping over designated levels, wherein the designated levels to be skipped are established autonomously from the hierarchy of formatting in the document.

14. The menu and application navigation system utilizing pressure of claim 13, wherein the skip over of designated levels is in response to a user input increasing pressure for a period of time and wherein the designated levels to be skipped are established autonomously from the three dimensional data set.

15. The menu and application navigation system utilizing pressure of claim 14, wherein the navigation engine is further configured to retain a display of a level previously navigated through and simultaneously display the previously navigated level of the three dimensional data set while displaying a next level of the three dimensional data set upon selection of the next level by the user.

16. The menu and application navigation system utilizing pressure of claim 14, wherein the navigation engine is further configured to:

anchor a first level of the three dimensional data set; and
navigate back to the first level of the three dimensional data set from a current level in response a termination of measurement of pressure.

17. The menu and application navigation system utilizing pressure of claim 14, wherein the navigation engine is further configured to fan out a current level of the data set in response to an input by the user concurrent to the pressure input, wherein the fan out displays the data set of the level in a fan configuration.

* * * * *